(12) United States Patent
Kim et al.

(10) Patent No.: US 11,160,011 B2
(45) Date of Patent: Oct. 26, 2021

(54) METHOD AND APPARATUS FOR REDUCING SYSTEM INFORMATION ACQUISITION TIME IN WIRELESS COMMUNICATION SYSTEM

(71) Applicant: LG ELECTRONICS INC., Seoul (KR)

(72) Inventors: Hongsuk Kim, Seoul (KR); Sangwon Kim, Seoul (KR); Youngdae Lee, Seoul (KR); Oanyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/637,721

(22) PCT Filed: Aug. 8, 2018

(86) PCT No.: PCT/KR2018/009030
§ 371 (c)(1),
(2) Date: Feb. 7, 2020

(87) PCT Pub. No.: WO2019/031843
PCT Pub. Date: Feb. 14, 2019

(65) Prior Publication Data
US 2020/0187100 A1    Jun. 11, 2020

Related U.S. Application Data

(60) Provisional application No. 62/542,320, filed on Aug. 8, 2017.

(51) Int. Cl.
*H04W 4/00* (2018.01)
*H04W 48/16* (2009.01)
(Continued)

(52) U.S. Cl.
CPC ........... *H04W 48/16* (2013.01); *H04W 24/10* (2013.01); *H04W 36/0055* (2013.01);
(Continued)

(58) Field of Classification Search
CPC ..... H04W 48/16; H04W 16/10; H04W 16/14; H04W 28/16; H04W 28/04; H04W 28/24;
(Continued)

(56) References Cited

U.S. PATENT DOCUMENTS 9,521,596 B2    12/2016 Wei et al.
2013/0303081 A1    11/2013 Chang et al.
(Continued)

FOREIGN PATENT DOCUMENTS

WO    2011005407    1/2011

OTHER PUBLICATIONS

PCT International Application No. PCT/KR2018/009030, International Search Report dated Jan. 25, 2019, 3 pages.

*Primary Examiner* — Temica M Beamer
(74) *Attorney, Agent, or Firm* — Lee, Hong, Degerman, Kang & Waimey (57) ABSTRACT

A method and apparatus for acquiring system information (SI) in a wireless communication system is provided. When a user equipment (UE) moves to a (neighbor) cell and if the UE have stored system information with same system information area code (SAC), the UE reuses the stored system information (SI) and skip acquiring whole system information blocks (SIBs). If the UE does not have matched SAC, the UE checks existence of any delta SI scheduling configuration which means that a group of SI message is to be update based on the stored information. If a SI message supporting delta configuration is broadcast at a cell and if the SI message includes a parameter which UE has previously
(Continued)

stored, the UE replaces the stored parameter by the parameter received from the SI message.

11 Claims, 9 Drawing Sheets

(51) Int. Cl.
    *H04W 24/10*     (2009.01)
    *H04W 36/00*     (2009.01)
    *H04W 36/14*     (2009.01)
    *H04W 48/10*     (2009.01)
    *H04W 48/20*     (2009.01)

(52) U.S. Cl.
    CPC ....... *H04W 36/0083* (2013.01); *H04W 36/14* (2013.01); *H04W 48/10* (2013.01); *H04W 48/20* (2013.01)

(58) Field of Classification Search
    CPC ......... H04W 36/0055; H04W 36/0083; H04W 36/14; H04W 24/00; H04W 24/10; H04W 88/06; H04W 60/00; H04W 72/04; H04W 72/0825; H04W 72/085; H04W 76/02
    USPC ................... 455/435.2, 450, 452.1; 370/331
    See application file for complete search history.

(56) References Cited

U.S. PATENT DOCUMENTS

| | | |
|---|---|---|
| 2016/0021584 A1 | 1/2016 | Zhang et al. |
| 2016/0262137 A1 | 9/2016 | Behravan et al. |
| 2019/0387461 A1* | 12/2019 | Ishii ...................... H04W 48/16 |
| 2019/0394753 A1* | 12/2019 | Adjakple .............. H04W 36/00 |
| 2021/0099860 A1* | 4/2021 | Chou ..................... H04W 8/24 |

* cited by examiner

METHOD AND APPARATUS FOR REDUCING SYSTEM INFORMATION ACQUISITION TIME IN WIRELESS COMMUNICATION SYSTEM

CROSS-REFERENCE TO RELATED APPLICATIONS

This application is the National Stage filing under 35 U.S.C. 371 of International Application No. PCT/KR2018/009030, filed on Aug. 8, 2018, which claims the benefit of U.S. Provisional Application No. 62/542,320 filed on Aug. 8, 2017, the contents of which are all hereby incorporated by reference herein in their entirety.

TECHNICAL FIELD

The present invention relates to wireless communications, and more particularly, to a method and apparatus for reducing system information acquisition time for mobility in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

With the introduction of narrowband internet-of-things (NB-IoT) in Rel-13 and its enhancement to support positioning, multi-cast, reduced latency and power consumption, and non-anchor carrier operation in Rel-14, NB-IoT is a technology which addresses a very wide range of the use cases and applications for cellular machine-to-machine (M2M) technologies. Further enhancements are proposed to enable NB-IoT to support the IoT ecosystem as it develops to have a wide range of applications, deployments, and device types, whilst continuing the focus on a very low cost UE with deep coverage support and high connection capacity.

SUMMARY

Reducing system information (SI) acquisition time has been discussed for enhancing NB-IoT in Rel-15. A solution is needed to support the SI acquisition time reduction for mobility in Rel-15.

In an aspect, a method for acquiring system information (SI) by a user equipment (UE) in a wireless communication system is provided. The method includes acquiring a first system information block type-1 (SIB1) and first SI scheduled by the first SIB1 from a first cell, wherein the first SIB1 includes information on a first system information area in which the first cell belongs, camping on a second cell by performing cell reselection, acquiring a second SIB1 from a second cell, wherein the second SIB1 includes information on a second system information area in which the second cell belongs and a list of SIs which is to be updated based on difference from stored SI for the first system information area, determining whether the first system information area and the second system information area is same, if it is determined that the first system information area and the second system information area is same, using the first SI received from the first cell and skipping a remaining SI acquisition procedure, and if it is determined that the first system information area and the second system information area is not same, acquiring a second SI scheduled by the second SIB1, wherein the second SI only includes difference from the first SI.

In another aspect, a user equipment (UE) in a wireless communication system is provided. The UE includes a memory, a transceiver, a processor, coupled to the memory and the transceiver, that controls the transceiver to acquire a first system information block type-1 (SIB1) and first SI scheduled by the first SIB1 from a first cell, wherein the first SIB1 includes information on a first system information area in which the first cell belongs, camps on a second cell by performing cell reselection, controls the transceiver to acquire a second SIB1 from a second cell, wherein the second SIB1 includes information on a second system information area in which the second cell belongs and a list of SIs which is to be updated based on difference from stored SI for the first system information area, determines whether the first system information area and the second system information area is same, if it is determined that the first system information area and the second system information area is same, uses the first SI received from the first cell and skips a remaining SI acquisition procedure, and if it is determined that the first system information area and the second system information area is not same, controls the transceiver to acquire a second SI scheduled by the second SIB1, wherein the second SI only includes difference from the first SI.

System information acquisition time can be reduced, specifically for NB-IoT.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
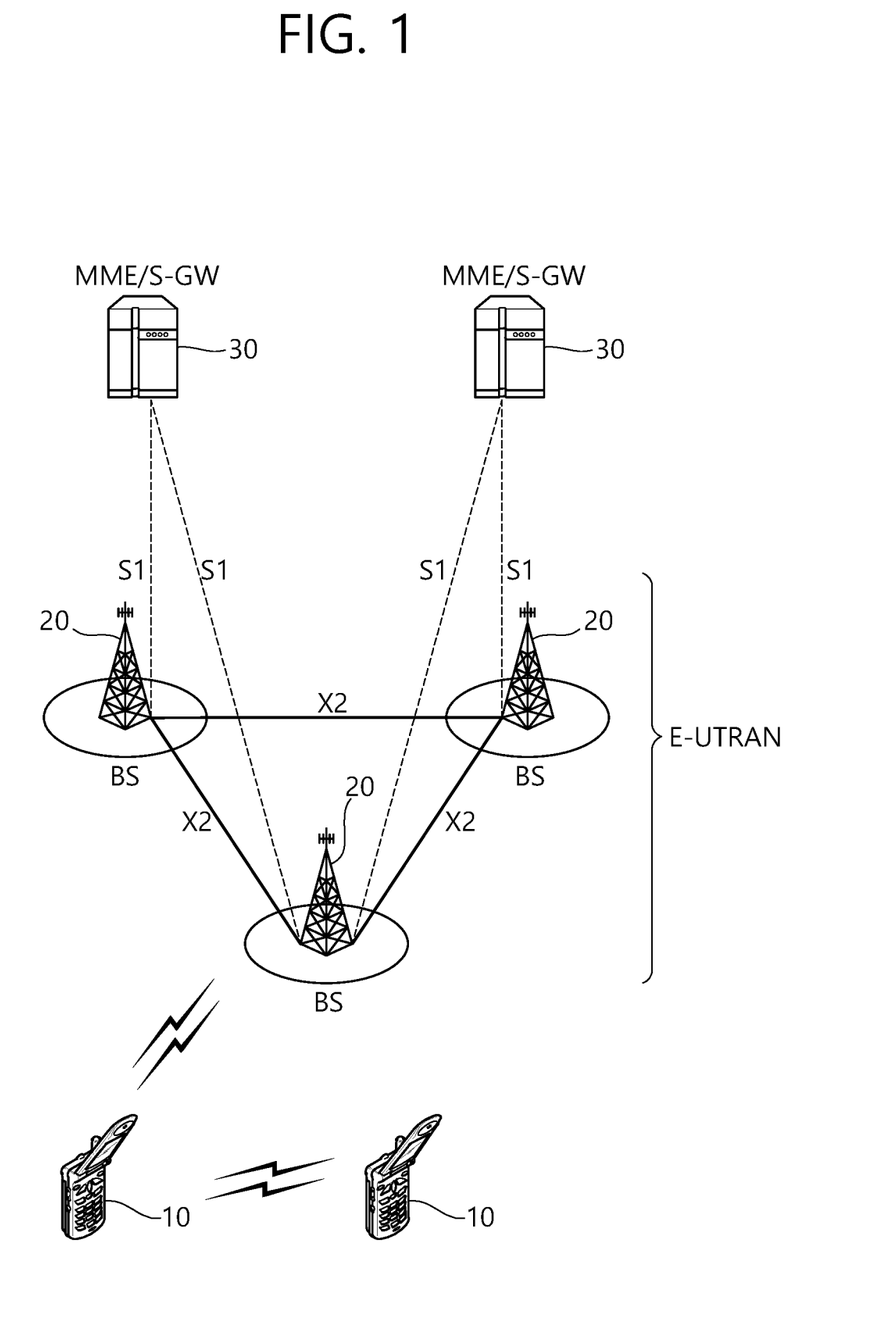
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
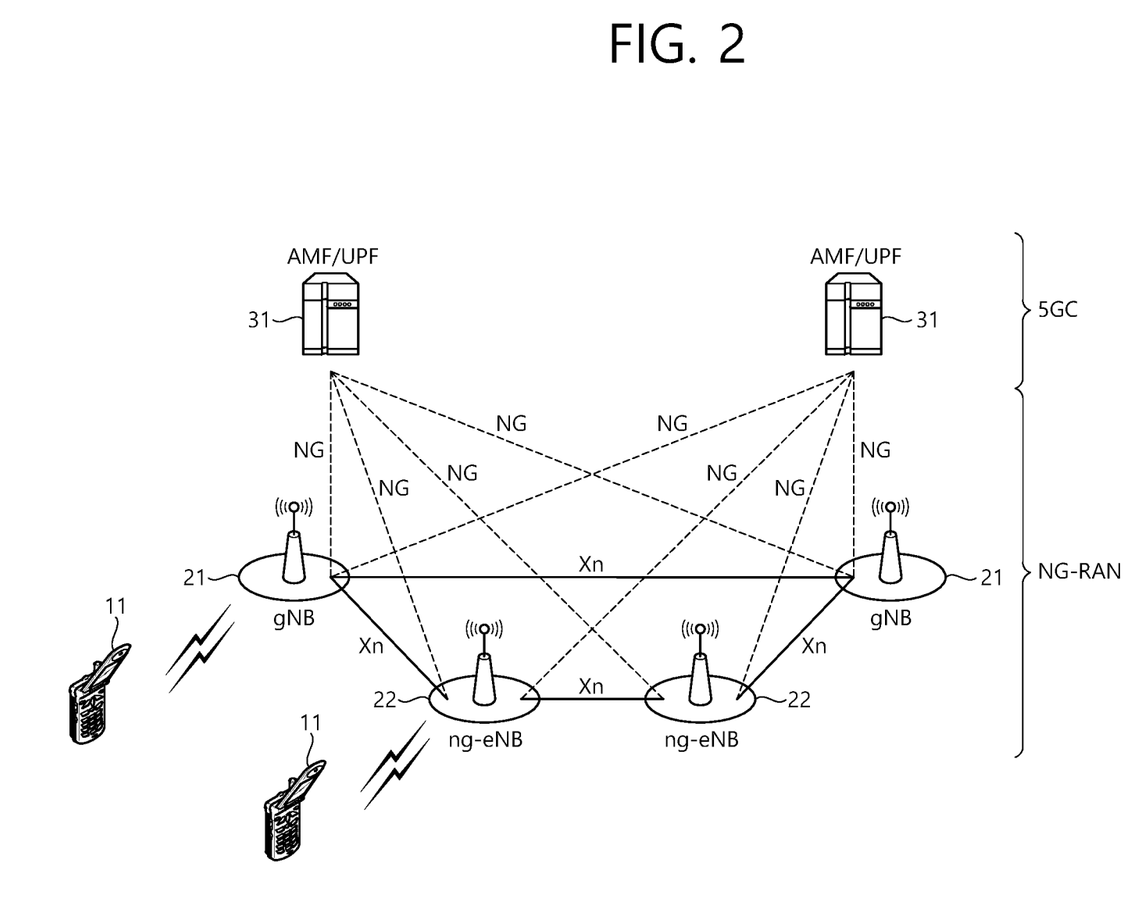
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
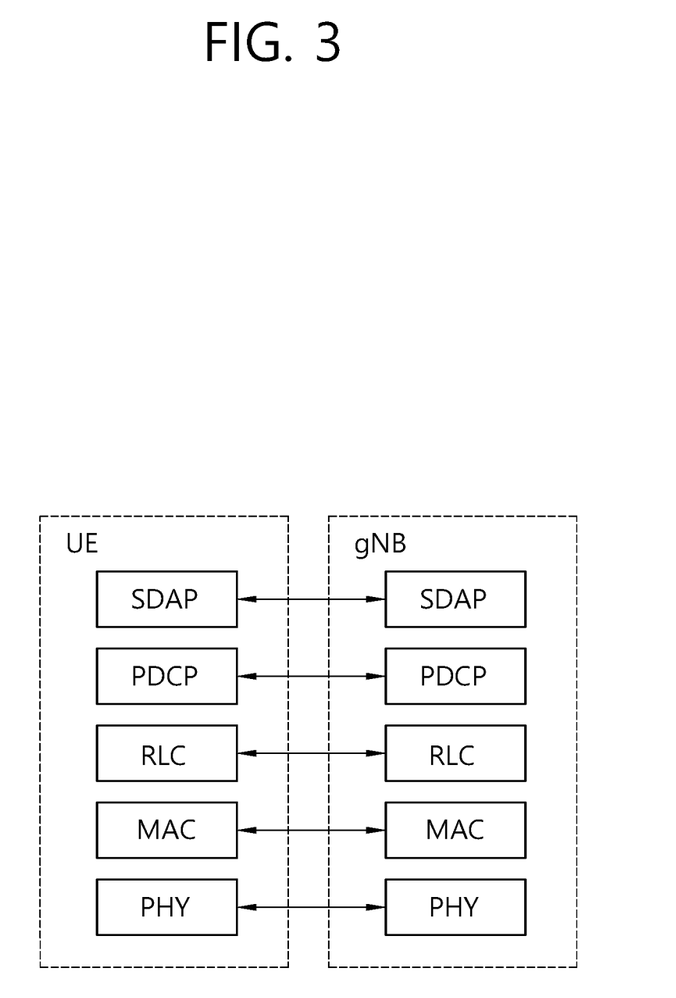
FIG. 3 shows a block diagram of a user plane protocol stack to which technical features of the present invention can be applied.
Figure 4:
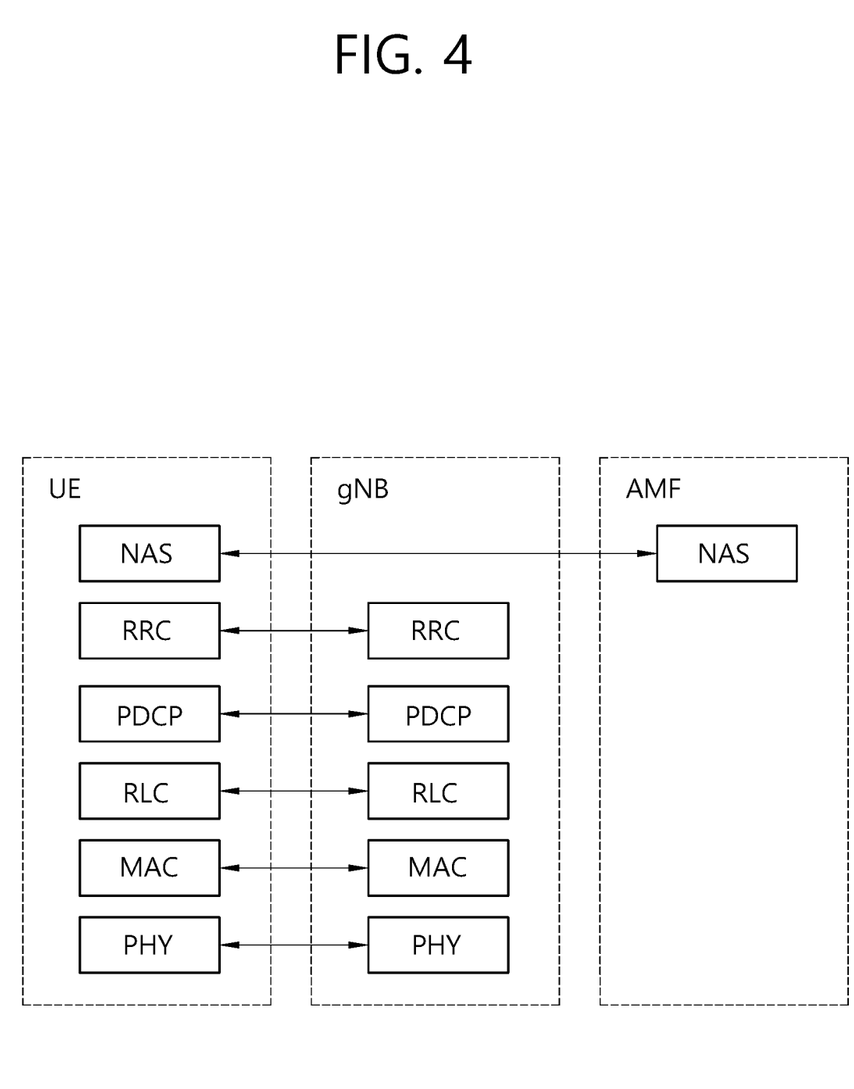
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Narrowband internet-of-things (NB-IoT) is described. NB-IoT provides access to network services using physical layer optimized for very low power consumption. For example, full carrier bandwidth may be 180 kHz, which is significantly narrower than typical carrier bandwidth. Sub-carrier spacing may be 3.75 kHz or 15 kHz). A number of E-UTRA protocol functions supported by all Rel-8 UEs are not used for NB-IoT and need not be supported by eNBs and UEs only using NB-IoT.

System information is described. System information is divided into the master information block (MIB; MasterInformationBlock) and a number of system information blocks (SIBs). The MIB includes a limited number of most essential and most frequently transmitted parameters that are needed to acquire other information from the cell, and is transmitted on BCH. SIBs other than system information block type-1 (SIB1; SystemInformationBlockType1) are carried in SI messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; System information type block type-2 (SIB2; SystemInformationBlockType2) is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH.

The bandwidth reduced low complexity (BL) UEs and UEs in coverage enhancement (CE) apply bandwidth reduced (BR) version of the SIB or SI messages. Hereinafter, anything applicable for a particular SIB or SI message equally applies to the corresponding BR version unless explicitly stated otherwise.

For NB-IoT, a reduced set of system information block with similar functionality but different content is defined. The UE applies the NB version of the MIB and the SIBs. These are denoted MasterInformationBlock-NB and SystemInformationBlockTypeX-NB. All other system information blocks (without NB suffix) are not applicable to NB-IoT.

In addition to broadcasting, E-UTRAN may provide SystemInformationBlockType1 and/or SystemInformationBlockType2, including the same parameter values, via dedicated signaling, i.e. within an RRCConnectionReconfiguration message.

The UE applies the system information acquisition and change monitoring procedures for the primary cell (PCell), except when being a BL UE or a UE in CE or a NB-IoT UE in RRC_CONNECTED mode while T311 is not running. For a secondary cell (SCell), E-UTRAN provides, via dedicated signaling, all system information relevant for operation in RRC_CONNECTED when adding the SCell. However, a UE that is configured with dual connectivity (DC) shall acquire the MasterInformationBlock of the primary SCell (PSCell) but use it only to determine the system frame number (SFN) timing of the secondary cell group (SCG), which may be different from the master cell group (MCG). Upon change of the relevant system information of a configured SCell, E-UTRAN releases and subsequently adds the concerned SCell, which may be done with a single RRCConnectionReconfiguration message. If the UE is receiving or interested to receive a multimedia broadcast multicast services (MBMS) service in a cell, the UE shall apply the system information acquisition and change monitoring procedure to acquire parameters relevant for MBMS operation and apply the parameters acquired from system information only for MBMS operation for this cell.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For time division duplex (TDD)/frequency division duplex (FDD) system with a bandwidth larger than 1.4 MHz that supports BL UEs or UEs in CE, MIB transmission may be repeated in subframe #9 of the previous radio frame for FDD and subframe #5 of the same radio frame for TDD.

The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR uses a schedule with a periodicity of 80 ms. TBS for SystemInformationBlockType1-BR and the repetitions made within 80 ms are indicated via schedulingInfoSIB1-BR in MIB.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than multimedia broadcast multicast service single frequency network (MBSFN) subframes, uplink subframes in TDD, and subframe #5 of radio frames for which SFN mod 2=0. The UE acquires the detailed time-domain scheduling (and other information, e.g. frequency-domain scheduling, used transport format) from decoding system information radio network temporary identity (SI-RNTI) on PDCCH. For a BL UE or a UE in CE, the detailed time/frequency domain scheduling information for the SI messages is provided in SystemInformationBlockType1-BR.

SystemInformationBlockType1 configures the SI-window length and the transmission periodicity for the SI messages.

The MasterinformationBlock-NB (MIB-NB) uses a fixed schedule with a periodicity of 640 ms and repetitions made within 640 ms. The first transmission of the MIB-NB is scheduled in subframe #0 of radio frames for which the SFN mod 64=0 and repetitions are scheduled in subframe #0 of all other radio frames. The transmissions are arranged in 8 independently decodable blocks of 80 ms duration.

The SystemInformationBlockType1-NB (SIB1-NB) uses a fixed schedule with a periodicity of 2560 ms. SIB1-NB transmission occurs in subframe #4 of every other frame in 16 continuous frames. The starting frame for the first transmission of the SIB1-NB is derived from the physical cell ID (PCID) and the number of repetitions within the 2560 ms period and repetitions are made, equally spaced, within the 2560 ms period. Transport block size (TBS) for SystemInformationBlockType1-NB and the repetitions made within the 2560 ms are indicated by schedulingInfoSIB1 field in the MIB-NB.

The SI messages are transmitted within periodically occurring time domain windows (referred to as SI-windows) using scheduling information provided in SystemInformationBlockType1-NB. Each SI message is associated with a SI-window and the SI-windows of different SI messages do not overlap. That is, within one SI-window only the corresponding SI is transmitted. The length of the SI-window is common for all SI messages, and is configurable.

Within the SI-window, the corresponding SI message can be transmitted a number of times over 2 or 8 consecutive NB-IoT DL subframes depending on TBS. The UE acquires the detailed time/frequency domain scheduling information and other information, e.g. used transport format for the SI messages from schedulingInfoList field in SystemInformationBlockType1-NB. The UE is not required to accumulate several SI messages in parallel but may need to accumulate a SI message across multiple SI windows, depending on coverage condition.

SystemInformationBlockType1-NB configures the SI-window length and the transmission periodicity for all SI messages.

Figure 5:
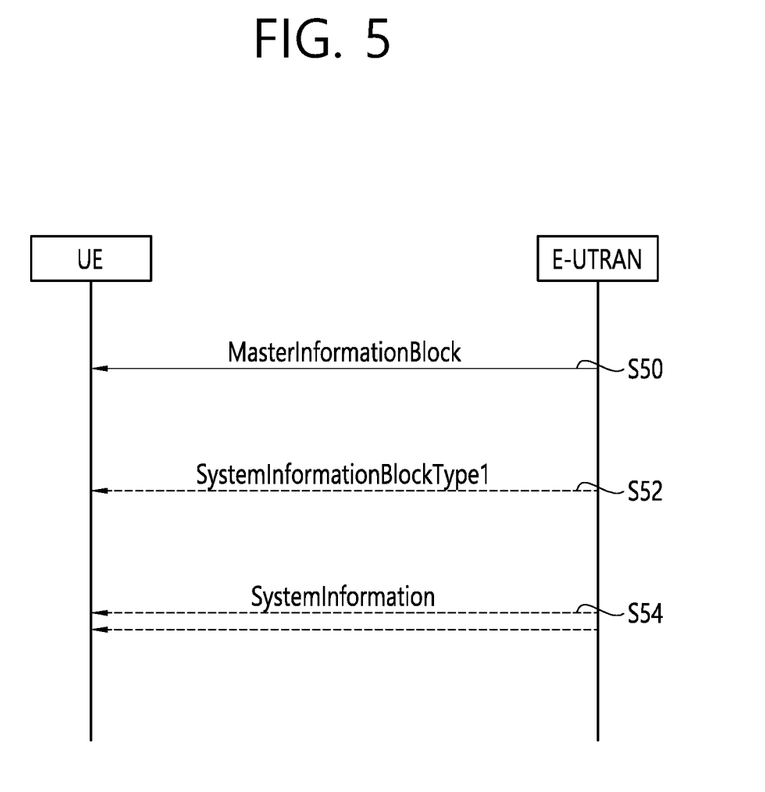
FIG. 5 shows a system information acquisition procedure.

FIG. 5 shows a system information acquisition procedure. Referring to FIG. 5, in step S50, the UE acquires the MIB from the E-UTRAN. In step S52, the UE acquires the SIB1. In step S54, the UE acquires other SI messages.

The UE applies the system information acquisition procedure to acquire the AS- and NAS-system information that is broadcasted by the E-UTRAN. The procedure applies to UEs in RRC_IDLE and UEs in RRC_CONNECTED. The UE shall apply the system information acquisition procedure upon selecting (e.g. upon power on) and upon re-selecting a cell, after handover completion, after entering E-UTRA from another RAT, upon return from out of coverage, upon receiving a notification that the system information has changed, upon receiving an indication about the presence of an earthquake and tsunami warning system (ETWS) notification, upon receiving an indication about the presence of a commercial mobile alert system (CMAS) notification, upon receiving a notification that the extended access barring (EAB) parameters have changed, upon receiving a request from CDMA2000 upper layers and upon exceeding the maximum validity duration. Unless explicitly stated otherwise in the procedural specification, the system information acquisition procedure overwrites any stored system information, i.e. delta configuration is not applicable for system information and the UE discontinues using a field if it is absent in system information unless explicitly specified otherwise.

In RRC_CONNECTED, BL UEs and UEs in CE are required to acquire system information when T311 is running or upon handover where the UE is only required to acquire the MasterInformationBlock in the target PCell.

When acquiring an SI message, the BL UE or UE in CE or NB-IoT UE shall:
1> determine the start of the SI-window for the concerned SI message as follows:
2> for the concerned SI message, determine the number n which corresponds to the order of entry in the list of SI messages configured by schedulingInfoList in SystemInformationBlockType1-BR (or SystemInformationBlockType1-NB in NB-IoT);
2> determine the integer value $x=(n-1)*w$, where w is the si-WindowLength-BR (or si-WindowLength in NB-IoT);
2> if the UE is a NB-IoT UE:

3> the SI-window starts at the subframe #0 in the radio frame for which (H-SFN*1024+SFN) mod T=FLOOR(x/10)+Offset, where T is the si-Periodicity of the concerned SI message and, Offset is the offset of the start of the SI-Window (si-RadioFrameOffset);
2> else:
3> the SI-window starts at the subframe #0 in the radio frame for which SFN mod T=FLOOR(x/10), where T is the si-Periodicity of the concerned SI message;
1> if the UE is a NB-IoT UE:
2> receive and accumulate SI message transmissions on DL-SCH from the start of the SI-window and continue until the end of the SI-window whose absolute length in time is given by si-WindowLength, starting from the radio frames as provided in si-RepetitionPattern and in subframes as provided in downlinkBitmap, or until successful decoding of the accumulated SI message transmissions excluding the subframes used for transmission of NB-IoT primary synchronization signal (NPSS), NB-IoT secondary synchronization signal (NSSS), MasterInformationBlock-NB and SystemInformationBlockType1 NB. If there are not enough subframes for one SI message transmission in the radio frames as provided in si-RepetitionPattern, the UE shall continue to receive the SI message transmission in the radio frames following the radio frame indicated in si-RepetitionPattern;
1> else:
2> receive and accumulate SI message transmissions on DL-SCH on narrowband provided by si-Narrowband, from the start of the SI-window and continue until the end of the SI-window whose absolute length in time is given by si-WindowLength-BR, only in radio frames as provided in si-RepentionPattern and subframes as provided in fddDownlinkOrTddSubframeBitmapBR in bandwidthReducedAccessRelatedInfo, or until successful decoding of the accumulated SI message transmissions;

1> if the SI message was not possible to decode from the accumulated SI message transmissions by the end of the SI-window, continue reception and accumulation of SI message transmissions on DL-SCH in the next SI-window occasion for the concerned SI message;

For Rel-15, acquisition time reduction for system information is supposed to be discussed as further enhancement in NB-IoT or MTC. According to this feature, the UE may be able to skip new SI acquisition, and reuse stored SI information in some cases. Therefore, cell search procedure and/or system information (at least MIN-NB) performance can be improved because the UE does not have to spend more time for SI acquisition. To support the system information acquisition time reduction feature, a various solution should be considered.

Hereinafter, a method for acquiring system information and/or a method for reducing system information acquisition time is described according to an embodiment of the present invention. According to an embodiment of the present invention, when the UE move to a neighbor cell and if the UE have stored system information with same system information area code (SAC), the UE may reuse the stored system information and skip acquiring whole SIBs. The SAC may be (global) cell identity or value tag or an index which represents a composition of whole system information in a cell or (partial) combination of them.

If the UE does not have matched SAC, via SIB1 on the current cell, the UE may check existence of any delta configuration for system information, which means that a group of SI message is to be update based on the stored system information. If a SI message supporting delta configuration is broadcast at the current cell and if the SI message includes a parameter which the UE has previously stored, the UE may replace the stored parameter with the parameter received from the SI message.

Table 1 shows an example of SIB1 according to an embodiment of the present invention. Table 1 shows an example of SIB1 for SAC#1.

TABLE 1

```
. . .
ScheuldingInfoList {
SI-message#1 {
  si-Periodicity
  sib-MappingInfo: SystemInformationBlockType2 }
SI-Message#2 {
    si-Periodicity
  sib-MappingInfo: SystemInformationBlockType3 & SystemInformationBlockType5
  updateSibInfoList (Option 1)
    sib-MappingInfo for SystemAreaCode#2: SystemInformationBlockType3-delta &
      SystemInformationBlockType5-delta
    sib-MappingInfo for SystemAreaCode#3: SystemInformationBlockType3-delta }
SI-message#3 {
    si-Periodicity
  sib-MappingInfo: SystemInformationBlockType7 & SystemInformationBlockType8
*102 updateSibInfoList (Option 1)
    sib-MappingInfo for SystemAreaCode#2: SystemInformationBlockType7-delta }
}
}
UpdateSibInfoList (Option 2)
SystemAreaCode#2 {
  si-Periodicity
  si-MappingInfo: SystemInformationBlockType3-delta & SystemInformationBlockType5-
delta & SystemInformationBlockType7-delta }
SystemAreaCode#3 {
  si-Periodicity
  si-MappingInfo: SystemInformationBlockType3-delta }
}
}
```

Referring to Table 1, in option 1, delta configuration for SI message is included in the legacy scheduling information list (ScheduligsnInfoList). Alternatively, in option 2, delta configuration for SI message is included in an independent scheduling information list (updateSchedulingInfoList).

The UE may receive the SIB1 for SAC#1 from a current cell according to Table 1. The UE may move to a neighbor cell. If the neighbor cell belongs to SAC#1, the UE may reuse the stored system information and skip acquiring whole SIBs. If the neighbor cell belongs to SAC#2, and the neighbor cell broadcasts one of SIB3, SIB5 or SIB7, the UE may replace the stored parameter with the parameter received from the SI message by using the delta configuration for SIB3, SIB5 or SIB7. If the neighbor cell belongs to SAC#3, and the neighbor cell broadcasts SIB3, the UE may replace the stored parameter with the parameter received from the SI message by using the delta configuration for SIB3.

Figure 6:
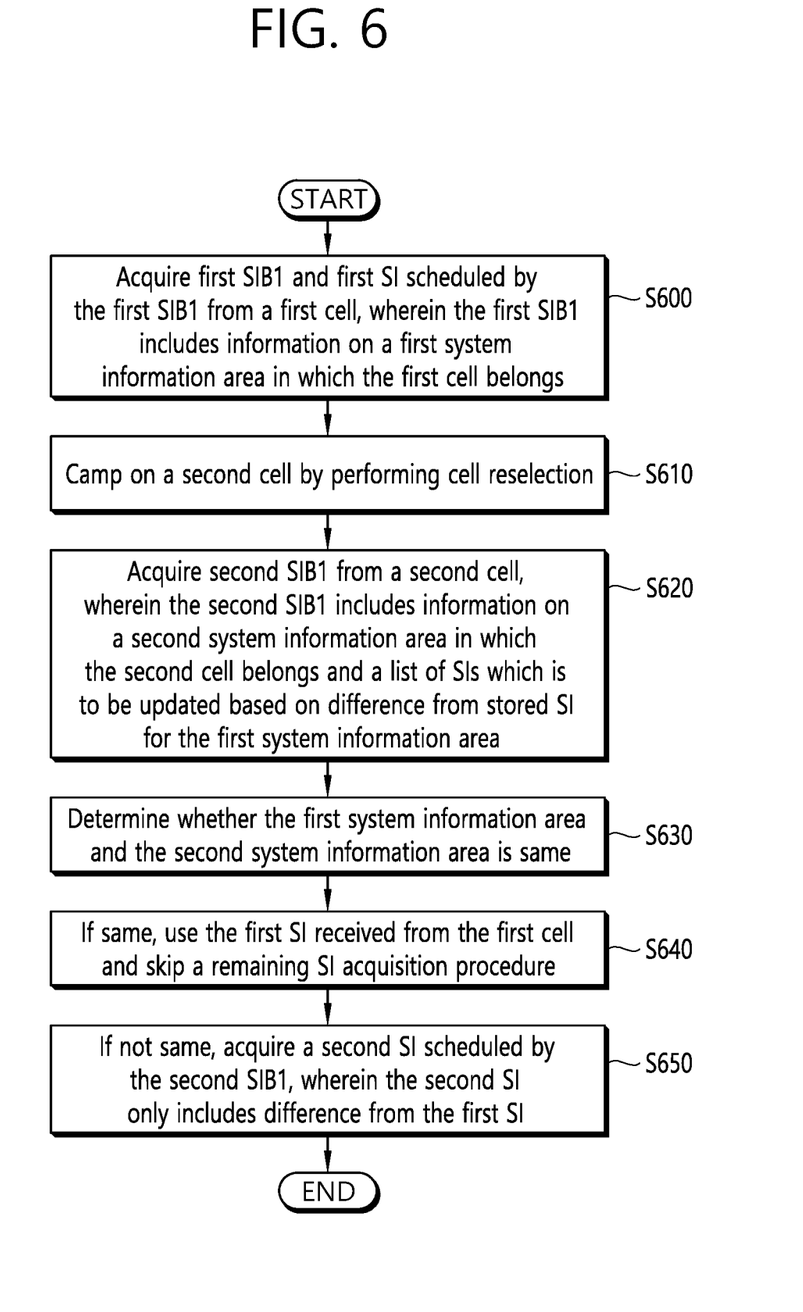
FIG. 6 shows a method for acquiring system information according to an embodiment of the present invention.

FIG. 6 shows a method for acquiring system information according to an embodiment of the present invention. In this embodiment, a cell which is able to support SI scheduling feature for acquisition time reduction may provide a value, i.e. SAC. The SAC may be shared by some neighbor cells. The SAC may mean essential configuration of one's cell system information to have an air interface between UE and the cell. The SAC may be commonly used to a group of cells which have same system information. The SAC may be included in the SystemInformationBlockType1. The SAC may correspond one of the following information.

(Global) Cell identity, i.e. CellGlobalIdEUTRA or CellIdentity
Tracking area code, i.e. TrackingAreaCode
System information value tag, i.e. SystemInfoValueTag
Index which represents a composition of whole system information in a cell
Combination of above values (e.g. mixed CellIdentity & SystemInfoValueTag)

If a cell provides a SAC to UEs but some part of system information need to be updated to the UE, the cell may provide a certain SI messages for delta configuration which contains only the some parameters of some SIBs to be updated. The scheduling information of the certain SI messages may be included in the same system information scheduling list which includes the scheduling information of the legacy SI messages, i.e. schedulingInfoList in SystemInformationBlockType1. Or, the scheduling information of the certain SI messages may be included in the separate system information scheduling list for delta configuration, i.e. updateSchedulingInfoList. However, the scheduling information of the certain SI messages may be differentiated with the scheduling information of the legacy SI messages so that the UE is able to acquire the only certain SI messages when the SAC and value tag are same.

In step S600, the UE acquires first SIB1 and first SI scheduled by the first SIB1 from a first cell. The first SIB1 may include information on a first system information area in which the first cell belongs. The information on the first system information area may correspond to first SAC.

In step 610, the UE camps on a second cell by performing cell reselection.

In step S620, the UE acquires second SIB1 from a second cell. The second SIB1 may include information on a second system information area in which the second cell belongs and a list of SIs which is to be updated based on difference from stored system information for the first system information area. The information on the second system information area may correspond to second SAC.

To reduce system information acquisition time, the UE may check whether the second SAC is included in the second SIB1. If the second SAC is included in the second SIB1, the UE may check whether the UE have stored system information from the previous cell, i.e. first cell, which was succeed to access. Else, the UE may acquire whole system information for the second cell to access. If the UE have the stored system information from the previous cell, the UE may check whether the SAC was included in the stored system information. Else, the UE may acquire whole system information for the second cell to access.

In step S630, the UE determines whether the first system information area and the second system information area is same.

In step S640, if the first system information area and the second system information area is same, i.e. the previous SAC from the stored system information is same with the current SAC of the (re)selected cell's system information, the UE reuses the stored system information, i.e. first SI received from the first cell, and skips a remaining SI acquisition procedure.

In step S650, if the first system information area and the second system information area is not same, i.e. the previous SAC from the stored system information is not same with the current SAC of the (re)selected cell's system information, but the previous SAC is included in the updateSchedulingInfoList of the first SIB1 or a SI message for delta parameter configuration in the legacy schedulingInfoList of the first SIB1, the UE acquires only some part of the SIBs which is needed to be update on the (re)selected cell comparing with the stored system information and reuse other stored system information. Else, the UE may acquire whole system information for the (re)selected cell to access.

Figure 7:
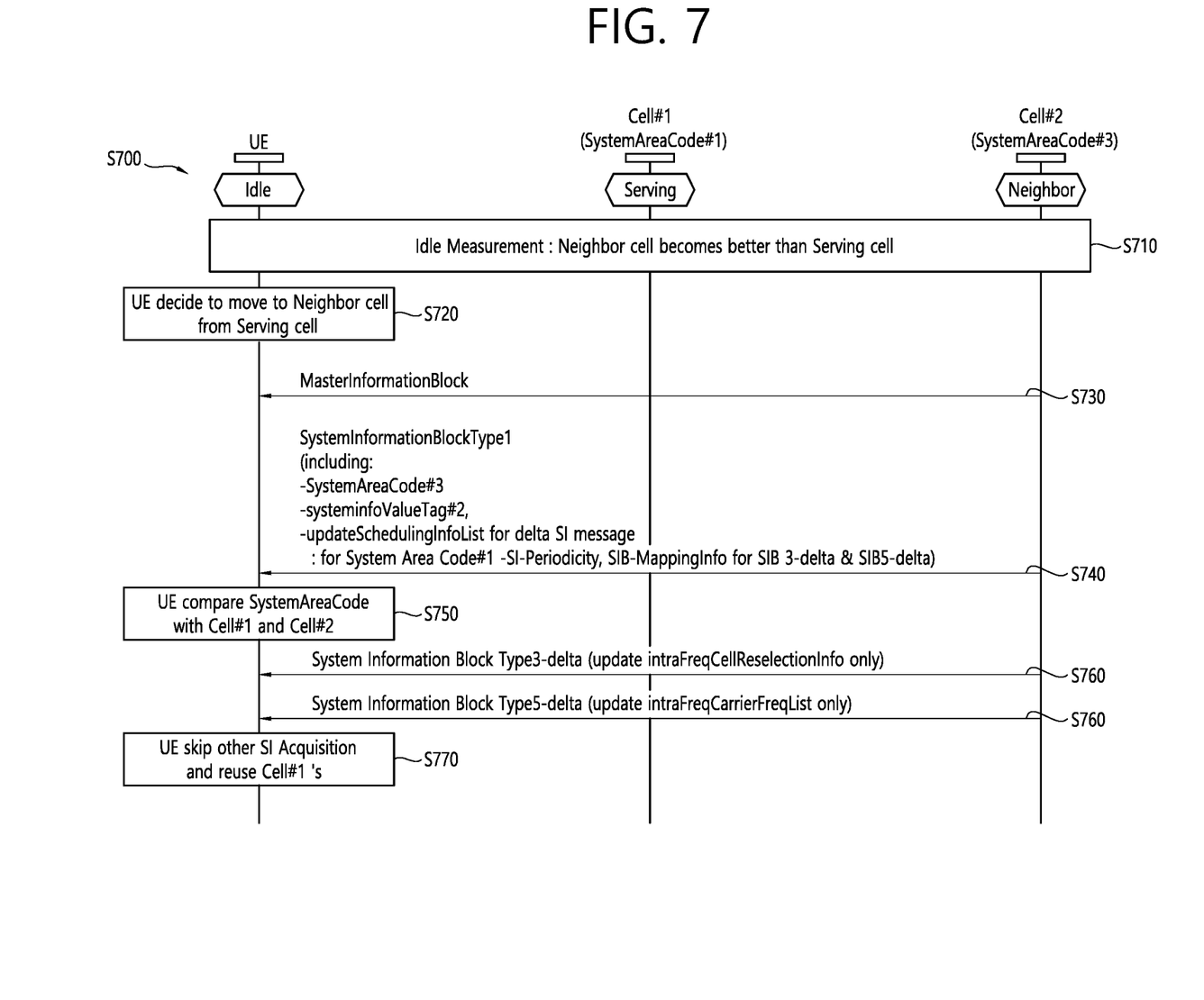
FIG. 7 shows an example of a system information acquisition procedure according to an embodiment of the present invention.

FIG. 7 shows an example of a system information acquisition procedure according to an embodiment of the present invention. In this embodiment, cell#1 belongs to SAC#1, and cell#2 belongs to SAC#3.

In step S700, the UE is in RRC_IDLE. Cell#1 is a current serving cell and cell#2 is a neighbor cell.

In step S710, the UE performs idle measurements. By the measurements, it is found that the neighbor cell, i.e. cell#2, becomes better than the serving cell, i.e. cell#1.

In step S720, the UE decides to move to cell#2 from cell #1.

In step S730, the UE receives the master information block from cell#2.

In step S740, the UE receives SIB1 from cell#2. The SIB1 includes SAC#3, in which the cell#2 belongs. The SIB1 includes updateSchedulingInfoList for delta SI message. The updateSchedulingInfoList indicates delta configuration of SIB3 and SIB5 for SAC#1.

In step S750, the UE compares SAC for cell#1 and cell#2. Because SAC for cell#1 is SAC#1, and SAC for cell#2 is SAC#3, the UE knows that SAC for cell#1 and cell#2 is different from each other.

In step S760, the UE receives delta configuration of SIB3 and SIB5. For example, only intraFreqCellReslectionInfo included in SIB3 may be updated by the delta configuration of SIB3, and only intraFreqCarrierFreqList included in SIB5 may be updated by the delta configuration of SIB5.

In step S770, the UE skips acquiring SIBs other than SIB3 and SIB5, and reuses the stored SIBs received from cell#1. Therefore, reduction of partial SI acquisition time can be succeeded.

Figure 8:
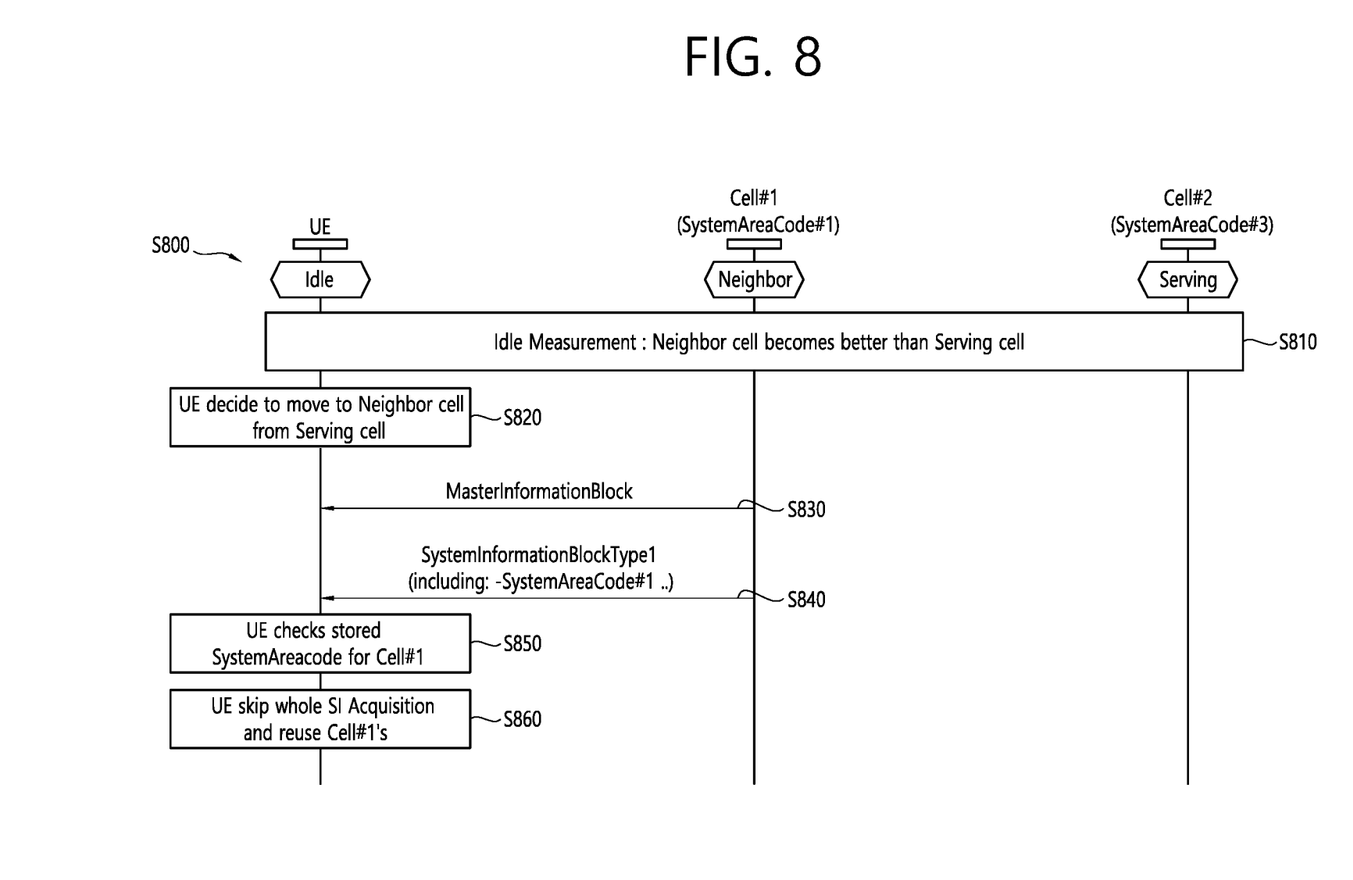
FIG. 8 shows an example of a system information acquisition procedure according to an embodiment of the present invention.

FIG. 8 shows an example of a system information acquisition procedure according to an embodiment of the present invention. In this embodiment, cell#1 belongs to SAC#1, and cell#2 belongs to SAC#3. FIG. 8 may follow FIG. 7.

In step S800, the UE is in RRC_IDLE. Cell#2 is a current serving cell and cell#1 is a neighbor cell.

In step S810, the UE performs idle measurements. By the measurements, it is found that the neighbor cell, i.e. cell#1, becomes better than the serving cell, i.e. cell#2.

In step S820, the UE decides to move to cell#1 from cell #2.

In step S830, the UE receives the master information block from cell#1.

In step S840, the UE receives SIB1 from cell#1. The SIB1 includes SAC#1, in which the cell#1 belongs.

In step S850, the UE checks stored SAC for cell#1. Since the UE camps on cell#1 previously, the UE may have stored SAC for cell#1.

In step S860, the UE skips acquitting whole SIBs, and reuses the stored SIBs received from cell#1. Therefore, reduction of whole SI acquisition time can be succeeded.

Figure 9:
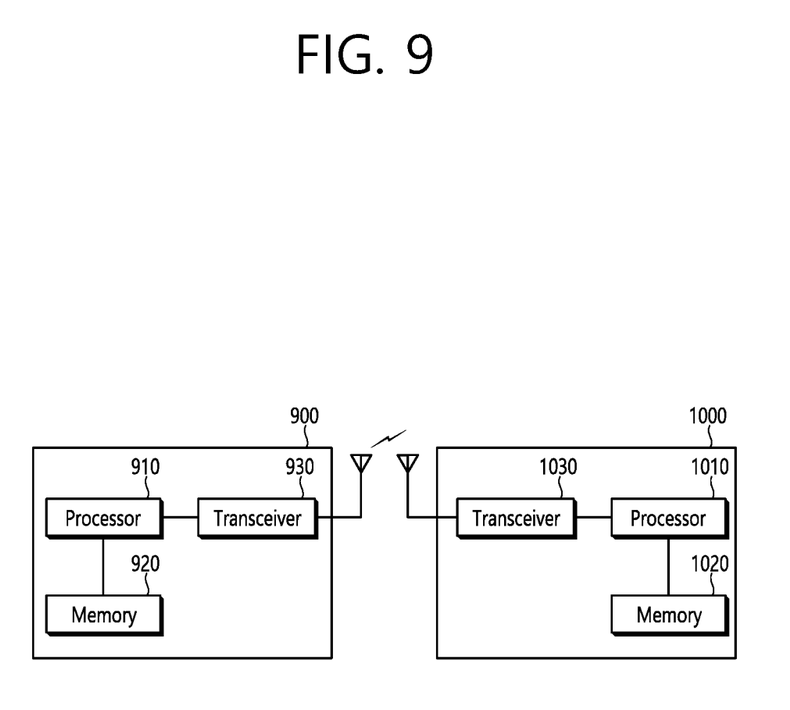
FIG. 9 shows a wireless communication system to implement an embodiment of the present invention.

FIG. 9 shows a wireless communication system to implement an embodiment of the present invention.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

A network node 1000 includes a processor 1010, a memory 1020 and a transceiver 1030. The processor 1010 may be configured to implement proposed functions, procedures and/or methods described in this description. Layers of the radio interface protocol may be implemented in the processor 1010. The memory 1020 is operatively coupled with the processor 1010 and stores a variety of information to operate the processor 1010. The transceiver 1030 is operatively coupled with the processor 1010, and transmits and/or receives a radio signal.

The processors 910, 1010 may include application-specific integrated circuit (ASIC), other chipset, logic circuit and/or data processing device. The memories 920, 1020 may include read-only memory (ROM), random access memory (RAM), flash memory, memory card, storage medium and/or other storage device. The transceivers 930, 1030 may include baseband circuitry to process radio frequency signals. When the embodiments are implemented in software, the techniques described herein can be implemented with modules (e.g., procedures, functions, and so on) that perform the functions described herein. The modules can be stored in memories 920, 1020 and executed by processors 910, 1010. The memories 920, 1020 can be implemented within the processors 910, 1010 or external to the processors 910, 1010 in which case those can be communicatively coupled to the processors 910, 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
   acquiring, from a first cell in a first system information (SI) area, a first system information block type-1 (SIB1) and SI related to the first SI area,
   wherein the first SIB1 comprises information informing the first SI area;
   performing a cell reselection from the first cell to a second cell in a second SI area;
   acquiring, from the second cell in the second SI area, a second SIB1 comprising i) information informing the second SI area, and ii) scheduling information for a delta configuration with respect to the SI related to the first SI area;
   based on the second SI area being the same as the first SI area, applying the SI related to the first SI area; and
   based on the second SI area being different from the first SI area:
   acquiring, from the second cell in the second SI area, the delta configuration based on the scheduling information,
   wherein the delta configuration includes first parameters that are updated in the SI related to the first SI area and excludes second parameters that are not updated in the SI related to the first SI area; and
   applying the delta configuration acquired from the second cell in the second SI area and the second parameters in the SI related to the first SI area.

2. The method of claim 1, wherein the information informing the first SI area comprises at least one of a cell identity, a tracking area code, a system information value tag or an index which represents a composition of whole system information in a cell.

3. The method of claim 1, wherein the first SI area comprises a group of cells, including the first cell, which have same system information.

4. The method of claim 1, wherein the second system SI area comprises a group of cells, including the second cell, which have same system information.

5. The method of claim 1, wherein the delta configuration is included in an independent scheduling information list of the second SIB1.

6. A user equipment (UE) in a wireless communication system, the UE comprising:
   a memory;
   a transceiver; and
   at least one processor, coupled to the memory and the transceiver, configured to:
      control the transceiver to acquire, from a first cell in a first system information (SI) area, a first system information block type-1 (SIB1) and SI related to the first SI area,
      wherein the first SIB1 comprises information informing the first SI area,
      perform a cell reselection from the first cell to a second cell in a second SI area,
      control the transceiver to acquire, from the second cell in the second SI area, a second SIB1 comprising i) information informing the second SI area, and ii) scheduling information for a delta configuration with respect to the SI related to the first SI area,
      based on the second SI area being the same as the first SI area, apply the SI related to the first SI area, and
      based on the second SI area being different from the first SI area:

control the transceiver to acquire, from the second cell in the second SI area, the delta configuration based on the scheduling information, wherein the delta configuration includes first parameters that are updated in the SI related to the first SI area and excludes second parameters that are not updated in the SI related to the first SI area, and apply the delta configuration acquired from the second cell in the second SI area and the second parameters in the SI related to the first SI area.

7. The UE of claim 6, wherein the information informing the first SI area comprises at least one of a cell identity, a tracking area code, a system information value tag or an index which represents a composition of whole system information in a cell.

8. The UE of claim 6, wherein the first SI area comprises a group of cells, including the first cell, which have same system information.

9. The UE of claim 6, wherein the second SI area comprises a group of cells, including the second cell, which have same system information.

10. The UE of claim 6, wherein the delta configuration is included in an independent scheduling information list of the second SIB1.

11. The method of claim 1, wherein the UE is in communication with at least one of a mobile device, a network, and/or autonomous vehicles other than the UE.

* * * * *